US006760046B2

(12) United States Patent
l'Anson et al.

(10) Patent No.: US 6,760,046 B2
(45) Date of Patent: Jul. 6, 2004

(54) LOCATION-DEPENDENT USER INTERFACE

(75) Inventors: Colin I'Anson, Bristol (GB); Rycharde Jeffery Hawkes, Bristol (GB); James Thomas Edward McDonnell, Bristol (GB); John Deryk Waters, Bath (GB); Lawrence Wilcock, Malmesbury (GB)

(73) Assignee: Hewlett Packard Development Company, L.P., Houston, TX (US)

( * ) Notice: Subject to any disclaimer, the term of this patent is extended or adjusted under 35 U.S.C. 154(b) by 452 days.

(21) Appl. No.: 09/814,129

(22) Filed: Mar. 22, 2001

(65) Prior Publication Data

US 2002/0054150 A1 May 9, 2002

(30) Foreign Application Priority Data

Mar. 29, 2000 (GB) ............................................. 0007474

(51) Int. Cl.[7] ................................................. G09G 5/00
(52) U.S. Cl. ........................ 345/746; 345/740; 345/744; 345/745; 345/762
(58) Field of Search ............................... 345/700, 740, 345/744, 745, 746, 747, 703, 762, 765; 709/201, 217

(56) References Cited

U.S. PATENT DOCUMENTS

| 5,519,760 A | * | 5/1996 | Borkowski et al. ....... 455/404.2 |
| 5,552,806 A | | 9/1996 | Lenchik |
| 5,881,131 A | * | 3/1999 | Farris et al. ............. 379/15.03 |
| 6,052,081 A | * | 4/2000 | Krasner ................. 342/357.02 |
| 6,134,548 A | | 10/2000 | Gottsman et al. ............... 707/5 |
| 6,262,725 B1 | * | 7/2001 | Hetherington et al. ....... 345/733 |
| 6,546,002 B1 | * | 4/2003 | Kim ........................... 370/351 |
| 6,609,146 B1 | * | 8/2003 | Slotznick ................... 709/200 |

FOREIGN PATENT DOCUMENTS

| DE | 19747745 A1 | 10/1997 | |
| EP | 0785535 A1 | 7/1997 | |
| EP | 0801342 A1 | 10/1997 | |
| EP | 0896460 A2 | 2/1999 | ........... H04L/29/06 |
| WO | WO 98/59506 | 12/1998 | ........... H04Q/7/22 |
| WO | WO 99/12104 | 3/1999 | ........... H04Q/7/38 |
| WO | WO 99/45732 | 9/1999 | ........... H04Q/7/38 |
| WO | WO 00/60886 | 10/2000 | ........... H04Q/7/22 |

* cited by examiner

Primary Examiner—Raymond J. Bayeri
Assistant Examiner—Cuong T. Thai (57) ABSTRACT

A method is provided of adapting a user interface to the user's current situation. The method involves a user specifying a home-area interface (83), for example, a web browser home page, and an "away" interface (84). When the user connects to a network (10) using a device (20) and calls up his/her browser home page, a determination is made of the location of the device in order to decide which version of the home page is to be served back to the user device by the home-page server of the user. In a preferred embodiment, the "away" home page (84) includes specific types of local data of interest to the user (such as best local restaurants). When asked to provide the "away" home page, the homepage server uses this information to find the URLs of local special interest web sites (122) carrying the relevant type of data, the server inserting these URLs in the "away" home page (84) before providing it to the user device (20) concerned.

20 Claims, 8 Drawing Sheets

(Prior Art)

Figure 3

(Prior Art)

Figure 4

(Prior Art)

Figure 5

(Prior Art)

LOCATION-DEPENDENT USER INTERFACE

FIELD OF THE INVENTION

The present invention relates to location-dependent user interface presented, for example, to the user of a mobile entity that has internet connectivity via a cellular radio infrastructure.

BACKGROUND OF THE INVENTION

The preferred embodiments of the invention to be described hereinafter are intended for use by mobile devices (as well as other devices) that have internet connectivity via a mobile radio infrastructure, the devices determining their location by methods associated with this infrastructure. Therefore, in order to facilitate an understanding of the present invention, a brief review is given below, with reference to FIGS. 1 to 6, of a typical mobile radio infrastructure and of various arrangements for location determination.

Communication infrastructures suitable for mobile users (in particular, though not exclusively, cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

Figure 1:
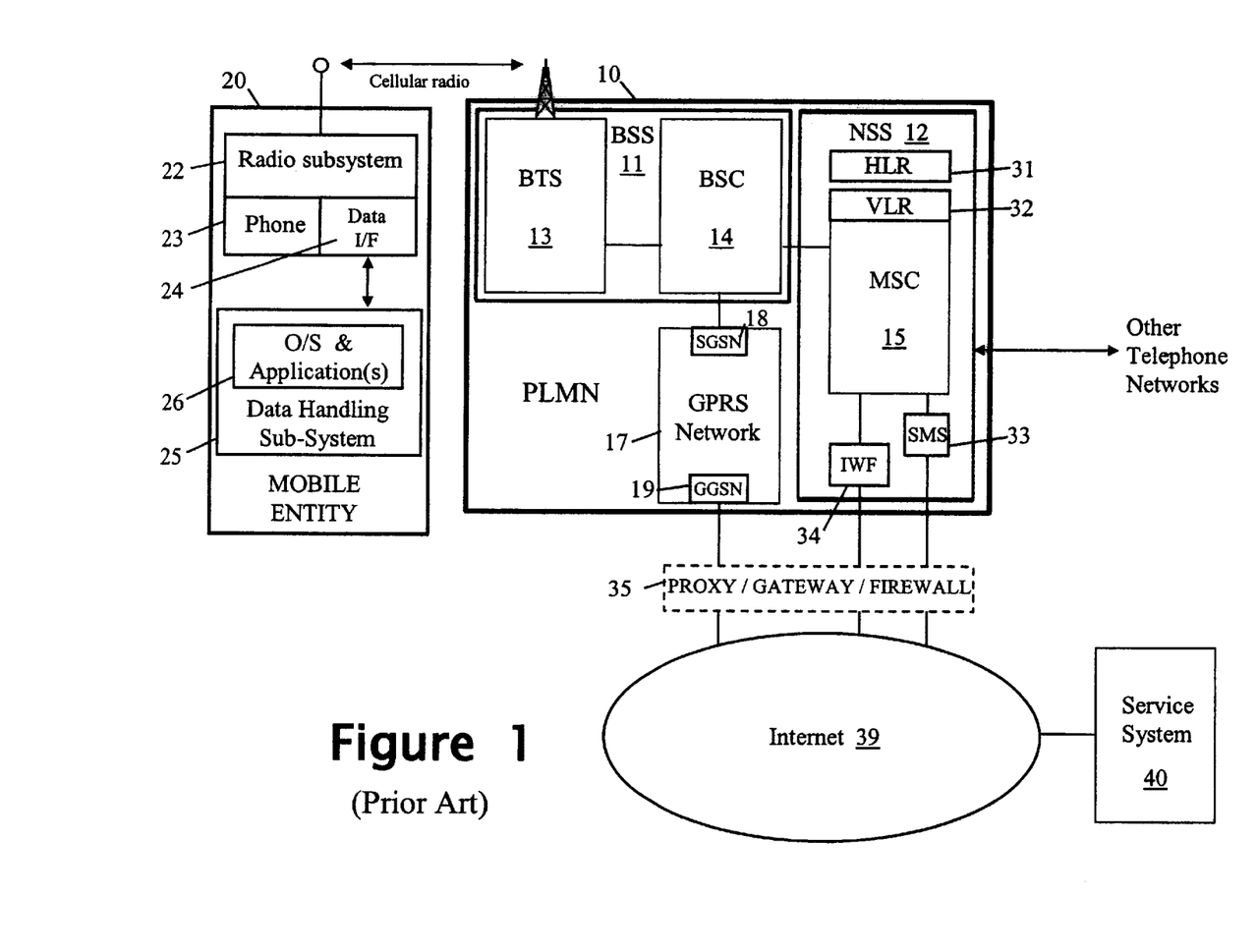
FIG. 1 is a diagram of a known communications infrastructure usable for transferring voice and data to/from a mobile entity.
Figure 2:
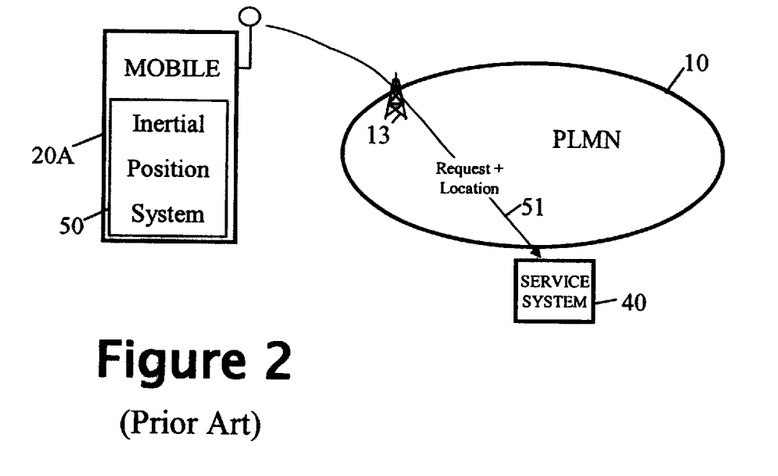
FIG. 2 is a diagram illustrating one known approach to determining the location of a mobile entity, this approach involving providing the entity with an inertial positioning system.

By way of example, FIG. 1 shows one form of known communication infrastructure for mobile users providing both telephony and data-bearer services. In this example, a mobile entity 20, provided with a radio subsystem 22 and a phone subsystem 23, communicates with the fixed infrastructure of GSM PLMN (Public Land Mobile Network) 10 to provide basic voice telephony services. In addition, the mobile entity 20 includes a data-handling subsystem 25 interworking, via data interface 24, with the radio subsystem 22 for the transmission and reception of data over a data-capable bearer service provided by the PLMN; the data-capable bearer service enables the mobile entity 20 to communicate with a service system 40 connected to the public Internet 39. The data handling subsystem 25 supports an operating environment 26 in which applications run, the operating environment including an appropriate communications stack.

More particularly, the fixed infrastructure 10 of the GSM PLMN comprises one or more Base Station Subsystems (BSS) 11 and a Network and Switching Subsystem NSS 12. Each BSS 11 comprises a Base Station Controller (BSC) 14 controlling multiple Base Transceiver Stations (BTS) 13 each associated with a respective "cell" of the radio network. When active, the radio subsystem 22 of the mobile entity 20 communicates via a radio link with the BTS 13 of the cell in which the mobile entity is currently located. As regards the NSS 12, this comprises one or more Mobile Switching Centers (MSC) 15 together with other elements such as Visitor Location Registers 32 and Home Location Register 32.

When the mobile entity 20 is used to make a normal telephone call, a traffic circuit for carrying digitised voice is set up through the relevant BSS 11 to the NSS 12 which is then responsible for routing the call to the target phone (whether in the same PLMN or in another network).

With respect to data transmission to/from the mobile entity 20, in the present example three different data-capable bearer services are depicted though other possibilities exist. A first data-capable bearer service is available in the form of a Circuit Switched Data (CSD) service; in this case a full traffic circuit is used for carrying data and the MSC 32 routes the circuit to an InterWorking Function IWF 34 the precise nature of which depends on what is connected to the other side of the IWF. Thus, IWF could be configured to provide direct access to the public Internet 39 (that is, provide functionality similar to an IAP—Internet Access Provider IAP). Alternatively, the IWF could simply be a modem connecting to a PSTN; in this case, Internet access can be achieved by connection across the PSTN to a standard IAP.

A second, low bandwidth, data-capable bearer service is available through use of the Short Message Service that passes data carried in signalling channel slots to an SMS unit which can be arranged to provide connectivity to the public Internet 39.

A third data-capable bearer service is provided in the form of GPRS (General Packet Radio Service which enables IP (or X.25) packet data to be passed from the data handling system of the mobile entity 20, via the data interface 24, radio subsystem 21 and relevant BSS 11, to a GPRS network 17 of the PLMN 10 (and vice versa). The GPRS network 17 includes a SGSN (Serving GPRS Support Node) 18 interfacing BSC 14 with the network 17, and a GGSN (Gateway GPRS Support Node) interfacing the network 17 with an external network (in this example, the public Internet 39). Full details of GPRS can be found in the ETSI (European Telecommunications Standards Institute) GSM 03.60 specification. Using GPRS, the mobile entity 20 can exchange packet data via the BSS 11 and GPRS network 17 with entities connected to the public Internet 39.

The data connection between the PLMN 10 and the Internet 39 will generally be through a firewall 35 with proxy and/or gateway functionality.

Different data-capable bearer services to those described above may be provided, the described services being simply examples of what is possible.

In FIG. 1, a service system 40 is shown connected to the Internet 40, this service system being accessible to the OS/application 26 running in the mobile entity by use of any of the data-capable bearer services described above. The data-capable bearer services could equally provide access to a service system that is within the domain of the PLMN operator or is connected to another public or private data network.

With regard to the OS/application software 26 running in the data handling subsystem 25 of the mobile entity 20, this could, for example, be a WAP application running on top of a WAP stack where "WAP" is the Wireless Application Protocol standard. Details of WAP can be found, for example, in the book "Official Wireless Application Protocol" Wireless Application Protocol Forum, Ltd published 1999 Wiley Computer Publishing. Where the OS/application software is WAP compliant, the firewall will generally also serve as a WAP proxy and gateway. Of course, OS/application 26 can comprise other functionality (for example, an e-mail client) instead of, or additional to, the WAP functionality.

The mobile entity 20 may take many different forms. For example, it could be two separate units such as a mobile phone (providing elements 22–24) and a mobile PC (data-handling system 25) coupled by an appropriate link (wireline, infrared or even short range radio system such as Bluetooth). Alternatively, mobile entity 20 could be a single unit such as a mobile phone with WAP functionality. Of course, if only data transmission/reception is required (and not voice), the phone functionality 24 can be omitted; an example of this is a PDA with built-in GSM data-capable functionality whilst another example is a digital camera (the data-handling subsystem) also with built-in GSM data-capable functionality enabling the upload of digital images from the camera to a storage server.

Whilst the above description has been given with reference to a PLMN based on GSM technology, it will be appreciated that many other cellular radio technologies exist and can typically provide the same type of functionality as described for the GSM PLMN 10.

Recently, much interest has been shown in "location-based", "location-dependent", or "location-aware" services for mobile users, these being services that take account of the current location of the user (or other mobile party). The most basic form of this service is the emergency location service whereby a user in trouble can press a panic button on their mobile phone to send an emergency request-for-assistance message with their location data appended. Another well known location-based service is the provision of traffic and route guiding information to vehicle drivers based on their current position. A further known service is a "yellow pages" service where a user can find out about amenities (shops, restaurants, theatres, etc.) local to their current location. The term "location-aware services" will be used herein to refer generically to these and similar services where a location dependency exists.

Location-aware services all require user location as an input parameter. A number of methods already exist for determining the location of a mobile user as represented by an associated mobile equipment. Example location-determining methods will now be described with reference to FIGS. 2 to 5. As will be seen, some of these methods result in the user knowing their location thereby enabling them to transmit it to a location-aware service they are interested in receiving, whilst other of the methods result in the user's location becoming known to a network entity from where it can be supplied directly to a location-aware service (generally only with the consent of the user concerned). It is to be understood that additional methods to those illustrated in FIGS. 2 to 5 exist.

As well as location determination, FIGS. 2 to 5 also illustrate how the mobile entity requests a location-aware service provided by service system 40. In the present examples, the request is depicted as being passed over a cellular mobile network (PLMN 10) to the service system 40. The PLMN is, for example, similar to that depicted in FIG. 1 with the service request being made using a data-capable bearer service of the PLMN. The service system 40 may be part of the PLMN itself or connected to it through a data network such as the public Internet. It should, however, be understood that infrastructure other than a cellular network may alternatively be used for making the service request The location-determining method illustrated in FIG. 2 uses an inertial positioning system 50 provided in the mobile entity 20A, this system 50 determining the displacement of the mobile entity from an initial reference position. When the mobile entity 20A wishes to invoke a location-aware service, it passes its current position to the corresponding service system 40 along with the service request 51. This approach avoids the need for an infrastructure to provide an external frame of reference; however, cost, size and long-term accuracy concerns currently make such systems unattractive for incorporation into mass-market handheld devices.

Figure 3:
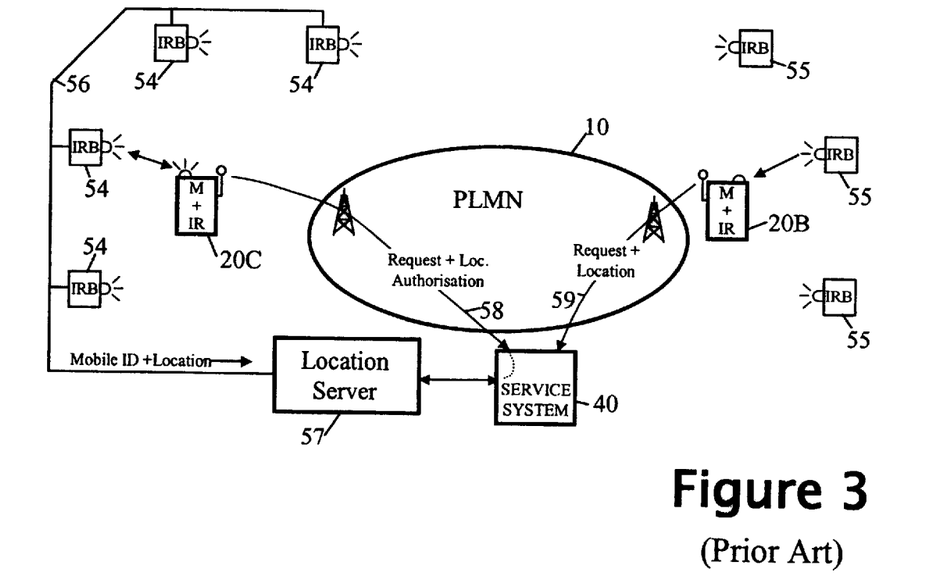
FIG. 3 is a diagram illustrating another known approach to determining the location of a mobile entity, this approach being based on proximity of the mobile entity to fixed-position local beacons.

FIG. 3 shows two different location-determining methods both involving the use of local, fixed-position, beacons here shown as infra-red beacons IRD though other technologies, such as short-range radio systems (in particular, "Bluetooth" systems) may equally be used. The right hand half of FIG. 3 show a number of independent beacons 55 that continually transmit their individual locations. Mobile entity 20B is arranged to pick up the transmissions from a beacon when sufficiently close, thereby establishing its position to the accuracy of its range of reception. This location data can then be appended to a request 59 made by the mobile entity 20B to a location-aware service available from service system 40. A variation on this arrangement is for the beacons 55 to transmit information which whilst not directly location data, can be used to look up such data (for example, the data maybe the Internet home page URL of a store housing the beacon 55 concerned, this home page giving the store location—or at least identity, thereby enabling look-up of location in a directory service).

In the left-hand half of FIG. 3, the IRB beacons 54 are all connected to a network that connects to a location server 57. The beacons 54 transmit a presence signal and when mobile entity 20C is sufficiently close to a beacon to pick up the presence signal, it responds by sending its identity to the beacon. (Thus, in this embodiment, both the beacons 54 and mobile entity 20C can both receive and transmit IR signals whereas beacons 55 only transmit, and mobile entity 20B only receives, IR signals). Upon a beacon 54 receiving a mobile entity's identity, it sends out a message over network 56 to location server 57, this message linking the identity of the mobile entity 20C to the location of the relevant beacon 54. Now when the mobile entity wishes to invoke a location-aware service provided by the service system 40, since it does not know its location it must include it's identity in the service request 58 and rely on the service system 40 to look up the current location of the mobile entity in the location server 57. Because location data is personal and potentially very sensitive, the location server 57 will generally only supply location data to the service system 40 after the latter has produced an authorizing token supplied by the mobile entity 20B in request 58. It will be appreciated that whilst service system 40 is depicted as handling service requests form both types of mobile entity 20 B and 20C, separate systems 40 may be provided for each mobile type (this is likewise true in respect of the service systems depicted in FIGS. 4 and 5).

Figure 4:
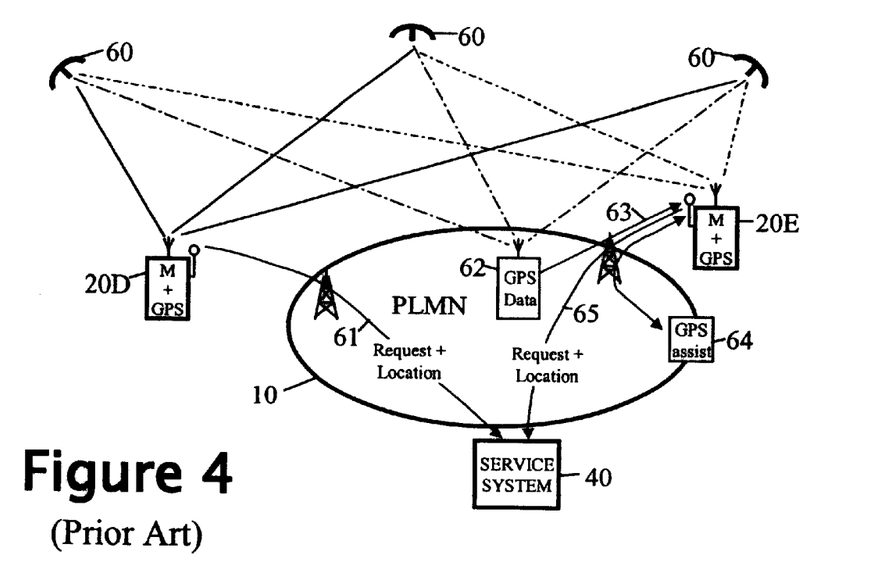
FIG. 4 is a diagram illustrating a further known approach to determining the location of a mobile entity, this approach involving the use of GPS satellites.

FIG. 4 depicts several forms of GPS location-determining system. On the left-hand side of FIG. 4, a mobile entity 20D is provided with a standard GPS module and is capable of determining the location of entity 20D by picking up signals from satellites 60. The entity 20D can then supply this location when requesting, in request 61, a location-aware service from service system 40.

The right-hand side of FIG. 4 depicts, in relation to mobile entity 20E, two ways in which assistance can be provided to the entity in deriving location from GPS satellites. Firstly, the PLMN 10 can be provided with fixed GPS receivers 62 that each continuously keep track of the satellites 60 visible from the receiver and pass information in messages 63 to local mobile entities 20E as to where to look for these satellites and estimated signal arrival times; this enables the mobile entities 20E to substantially reduce acquisition time for the satellites and increase accuracy of measurement (see "Geolocation Technology Pinpoints Wireless 911 calls within 15 Feet" Jul. 1, 1999 Lucent Technologies, Bell Labs). Secondly, as an alternative enhancement, the processing load on the mobile entity 20E can be reduced and encoded jitter removed using the services of network entity 64 (in or accessible through PLMN 10).

Once the mobile unit 20E has determined its location, it can pass this information in request 65 when invoking a location-aware service provided by service system 40.

Figure 5:
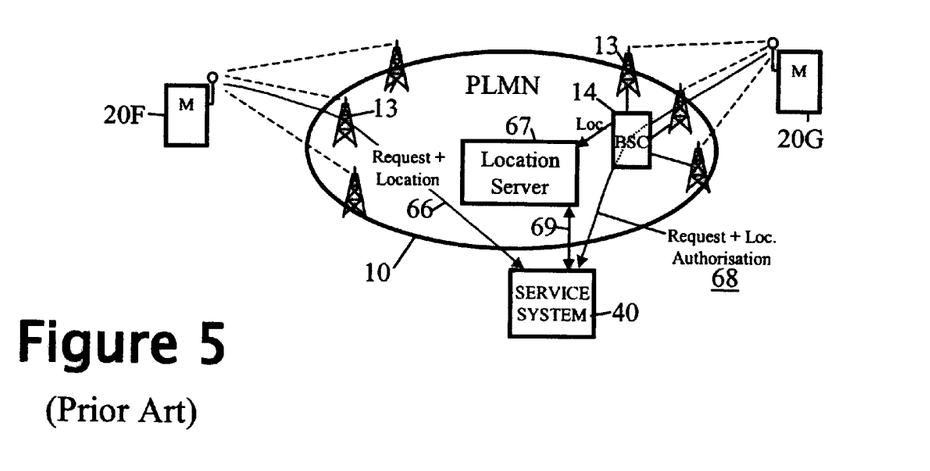
FIG. 5 is a diagram illustrating a still further approach to determining the location of a mobile entity, this approach being based on the use of signals present in a cellular mobile radio communications system.

FIG. 5 depicts two general approaches to location determination from signals present in a cellular radio infrastructure. First, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between the BSC 14 and the mobile entity). Beyond current basic cell ID, it is possible to get a more accurate fix by measuring timing and/or directional parameters between the mobile entity and multiple BTSs 13, these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 5 depicts the case of location determination being done in the mobile entity 20F by, for example, making Observed Time Difference (OTD) measurements with respect to signals from BTSs 13 and calculating location using a knowledge of BTS locations. The location data is subsequently appended to a service request 66 sent to service system 40 in respect of a location-aware service. The calculation load on mobile entity 20F could be reduced and the need for the mobile to know BTS locations avoided, by having a network entity do some of the work. The right-hand half of FIG. 5 depicts the case of location determination being done in the network, for example, by making Timing Advance measurements for three BTSs 13 and using these measurements to derive location (this derivation typically being done in a unit associated with BSC 14). The resultant location data is passed to a location server 67 from where it can be made available to authorised services. As for the mobile entity 20C in FIG. 3, when the mobile entity 20G of FIG. 5 wishes to invoke a location-aware service available on service system 50, it sends a request 69 including an authorisation token and its ID (possible embedded in the token) to the service system 40; the service system then uses the authorisation token to obtain the current location of the mobile entity 20G from the location server 67.

In the above examples, where the mobile entity is responsible for determining location, this will generally be done only at the time the location-aware service is being requested. Where location determination is done by the infrastructure, it may be practical for systems covering only a limited number of users (such as the system illustrated in the left-hand half of FIG. 2 where a number of infrared beacons 54 will cover a generally fairly limited) for location-data collection to be done whenever a mobile entity is newly detected by an IRB, this data being passed to location server 57 where it is cached for use when needed. However, for systems covering large areas with potentially a large number of mobile entities, such as the FIG. 5 system, it is more efficient to effect location determination as and when there is a perceived need to do so; thus, location determination may be triggered by the location server 67 in response to the service request 68 from the mobile entity 20G or the mobile entity may, immediately prior to making request 68, directly trigger BSC 14 to effect a location determination and feed the result to location server 67. Further with respect to the location servers 57, 67, whilst access authorisation by location-aware services has been described as being through authorisation tokens supplied by the mobile entities concerned, other authorisation techniques can be used. In particular, a location-aware service can be prior authorised with the location server in respect of particular mobile entities; in this case, each request from the service for location data needs only to establish that the request comes from a service authorised in respect of the mobile entity for which the location data is requested.

Figure 6:
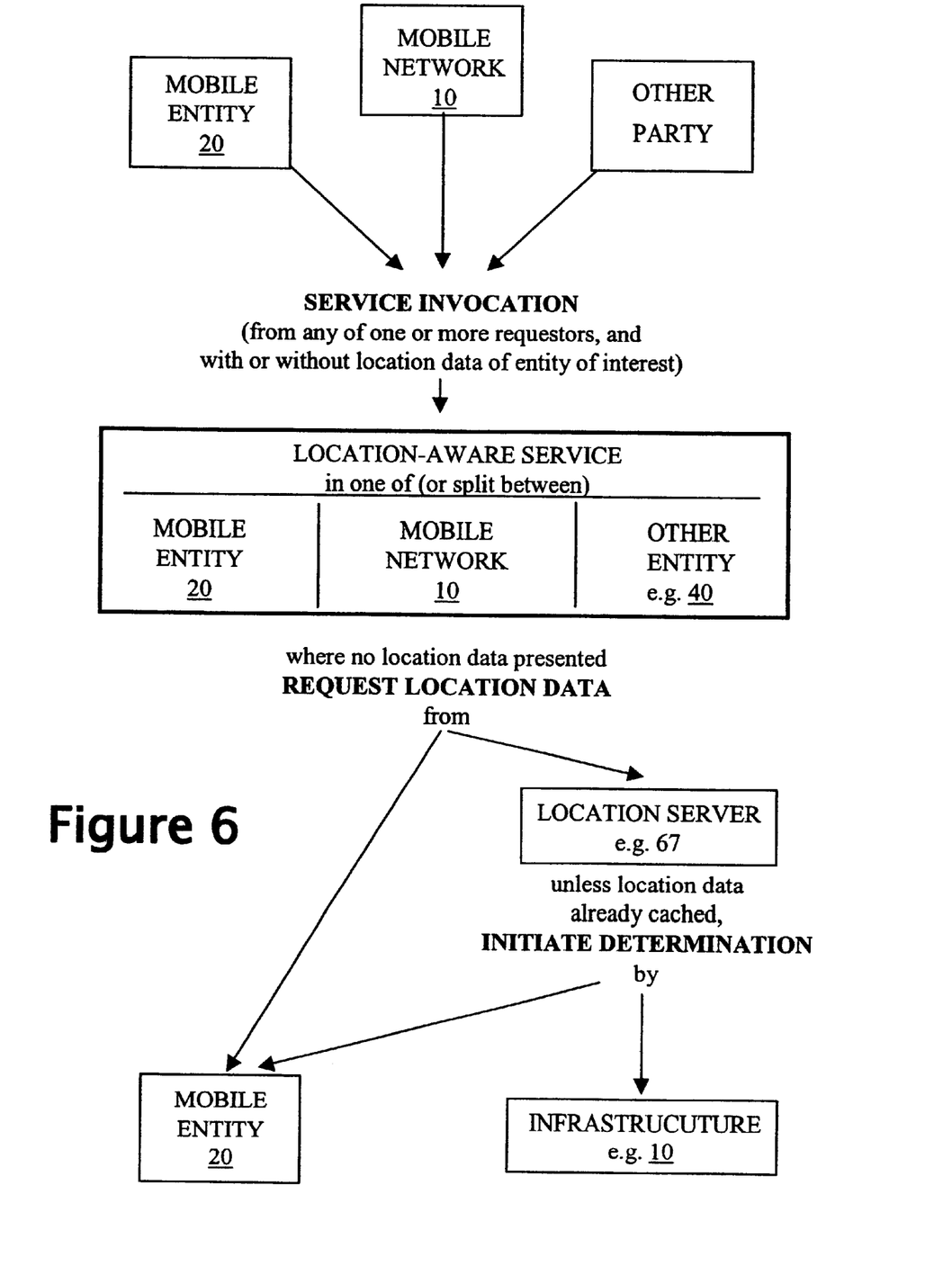
FIG. 6 is a diagram illustrating various different routes by which location information can be provided to a service system.

As already indicated, FIGS. 2 to 5 depict only some examples of how location determination can be achieved, there being many other possible combinations of technology used and where in the system the location-determining measurements are made and location is calculated, stored and used. Thus, the location-aware service may reside in the mobile entity whose location is of interest, in a network-connected service system 40 (as illustrated), or even in another mobile entity. Furthermore, whilst in the examples of FIGS. 2 to 5, invocation of the location-aware service has been by the mobile entity whose location is of interest, the nature of the location-aware service may be such that it is invoked by another party (including, potentially, the PLMN itself). In this case, unless the invoking party already knows the location of he mobile entity and can pass this information to the location-aware service (which may, for example, may be situation where the PLMN invokes the service), it is the location-aware service that is responsible for obtaining the required location data, either by sending a request to the mobile entity itself or by requesting the data from a location server. Unless the location server already has the needed information in cache, the server proceeds to obtain the data either by interrogating the mobile entity or by triggering infrastructure elements to locate the mobile. For example, where a location-aware service running on service system 40 in FIG. 5 needs to find the location of mobile 20G, it could be arranged to do so by requesting this information from location server 67 which in turn requests the location data from the relevant BSC, the latter then making the necessary determination using measurements from BTSs 13. FIG. 6 depicts the various possibilities discussed above.

Although in the foregoing, the provision of location data through the mobile radio infrastructure to the mobile entity has been treated as a service effected over a data-capable bearer channel, it may be expected that as location data becomes considered a basic element of mobile radio infrastructure services, provision will be made in the relevant mobile radio standards for location data to be passed over a signalling channel to the mobile entity.

The present invention concerns adapting a user interface, such as a browser interface presented on a mobile device, to the user's current situation. In this respect, it is well known that a use can not only specify their own home page design for recall whenever they start their web browser, but also that a user can specify their preferred interface to a particular service provider.

It is an object of the present invention to provide an improved method of adapting a user interface to the user's current situation.

SUMMARY OF THE INVENTION

According to one aspect of the present invention, a method of adapting a network-browser user interface to a user's current situation, comprises storing, in a system connected to a user-accessible network, user specific interface specification data defining at least first and second user interface data sets for use in implementing network-browser user interfaces in respective different geographic areas. The interface specification data specifies for each data set a respective set of subjects about which information is to be presented. The user, using a device running a network browser for browsing the network, determines which user-interface data set of the user's interface specification data is appropriate for the current location of the device. The appropriate data set is transferred to the device. The user uses the device to implement the network-browser user interface.

Another aspect of the invention relates to a system comprising a communications subsystem and a data store for user-specific interface specification data defining at least first and second user-interface data sets for use in implementing network-browser user interfaces in respective different geographic areas. The interface specification data specifies for each data set a respective set of subjects about which information is to be presented. A control subsystem handles a user request for a user-interface data set. The request is received via the communications subsystem from a user device running a network browser. The control subsystem comprises: (1) a user-identity checking arrangement for checking the identity of the user of the device; (2) a location arrangement for providing location information about the location of the device; (3) a processing arrangement for determining which of the user-interface data sets of the user's interface specification data is appropriate for the current location of the device as provided by the location-data arrangement; and (4) an arrangement for sending to the user device the interface data set determined as appropriate by the processing arrangement.

By way of example, the first data set could be intended for use in implementing a device user interface in a home area of a user whilst the second data set could be intended for use in implementing a device user interface in other areas; in this case, the step of determining which interface data set is appropriate for the current location of a user device would involve determining the current location of the user device and comparing it with the home area of the user.

Preferably, the interface specification data defines each subject in the set of subjects associated with each data set, by one of:
a specific data item;
a specific data-item reference;
a generic topic upon which a search can be conducted for items to be included in the user interface implemented using the data set concerned.

BRIEF DESCRIPTION OF THE DRAWINGS

A method and service-system, both embodying the present invention, for adapting the user interface of a device to the user's current situation, will now be described, by way of non-limiting example, with reference to the accompanying diagrammatic drawings, in which.

BEST MODE OF CARRYING OUT THE INVENTION

In the following description given with respect to FIGS. 7 to 12, the PLMN 10 and its means for providing data-capable bearer services for internet access are not shown in detail reasons of clarity; the form of the PLMN and how data-capable services are provided are, for example, as described above in relation to FIGS. 1 to 6. Furthermore, the generalisations discussed above in relation to the mobile entity 20 and location servers apply equally to these elements as participating in the embodiments of the invention described below.

Figure 7:
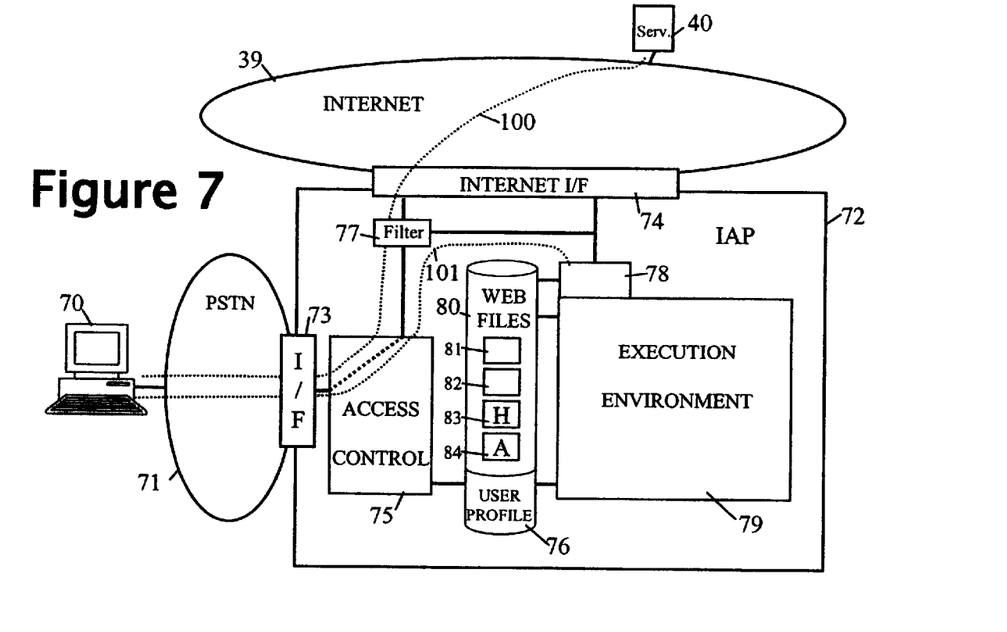
FIG. 7 is a diagram illustrating how a user can specify home and away browser home pages for storage at their internet access provider site.

FIG. 7 shows a service system 72 of an Internet Access Provider IAP providing dial-up access to the internet 30 for users accessing over PSTN 71 from, for example, a home PC 70. In FIG. 7, the PC 70 is illustrated as connecting to server 40 via PLMN 71, the IAP service system 72, and internet 39 (see dotted line 100). The provision of internet access is controlled in standard manner—for example, when a user uses PC 70 to dial into interface 73 (a modem bank) of the service system 72, an access control block 75 checks the user's received details (typically user-input username/ password, or calling line ID) against the details held for that user in a user-profile database 76. Assuming this check is passed, the user is given access to the internet 39 via interface 74.

Generally, the IAP provides a set of web pages for offering services to the user. When a user connecting through the IAP service system requests access to any of these pages, this request is picked up inside the service system by a filter 77 and diverted straight to the web server portion of the service system (see dotted line 101). The web server portion of system 72 comprises a store 80 of web files (html files, style-sheet files, images files, and script files such as CGI and ASP files), a server interface 78, and a script execution environment. 79. The server interface 78 receives HTTP requests, accesses the relevant file in store 80, and either returns that file directly to the requesting entity in an HTTP response, or, if the file contains server-side scripts, passes it to the execution environment 79 that executes the scripts and returns the result to server interface 78 for sending to the requesting entity. In FIG. 7, element 81 represents the "home page" file of the IAP. The IAP in charge of service system 72 offers the user of PC 70 the opportunity to specify a user home page for storage in store 80. This is a private home page intended for the user rather than a public home page intended for access by third parties (although the user could operate the private home page as a public one). The private home page is username/password protected but is accessible by the user both over the PSTN 71 and over the internet 71; password protection is achieved in standard manner well known to persons skilled in the art. The set-up (specification) of the private home page is effected through one or more script files 82 provided by the IAP for this purpose and accessible from the IAP's home page 80. The resultant private home page is stored as such in store 80 (or possibly as a set of defining parameters in the user's profile held in store 76).

In accordance with an embodiment of the present invention, the scripts 82 enable the user to store two versions of their private home page, namely a "home" private home page 83 intended for use when the user is in a home area, and an "away" private home page 84 intended for use when the user is away from their home area. The "home" version 83 may, for example, include links to store websites and event websites for stores and events local to the user's home area; the "away" version 84 may, for example, includes links to map websites, travel websites, currency exchange websites etc. In the present example, it is assumed that all the information required for the home and away versions is known and is directly incorporated into the home and away files 83, 84, these latter being given different names; however, as will be seen hereinafter, it is possible also to specify, by type, information that cannot be pre-inserted but must be fetched when needed, such as detailed area-specific information.

Again, in the present example, the user does not pass to the service system 72 location parameters defining what the user means by their home area—this is because, as will be seen, it is the accessing device that makes this decision. However, in other embodiments, it is the service system that determines when an accessing device is in the home area, this determination being made on the basis of a home area definition supplied by the user.

Figure 8:
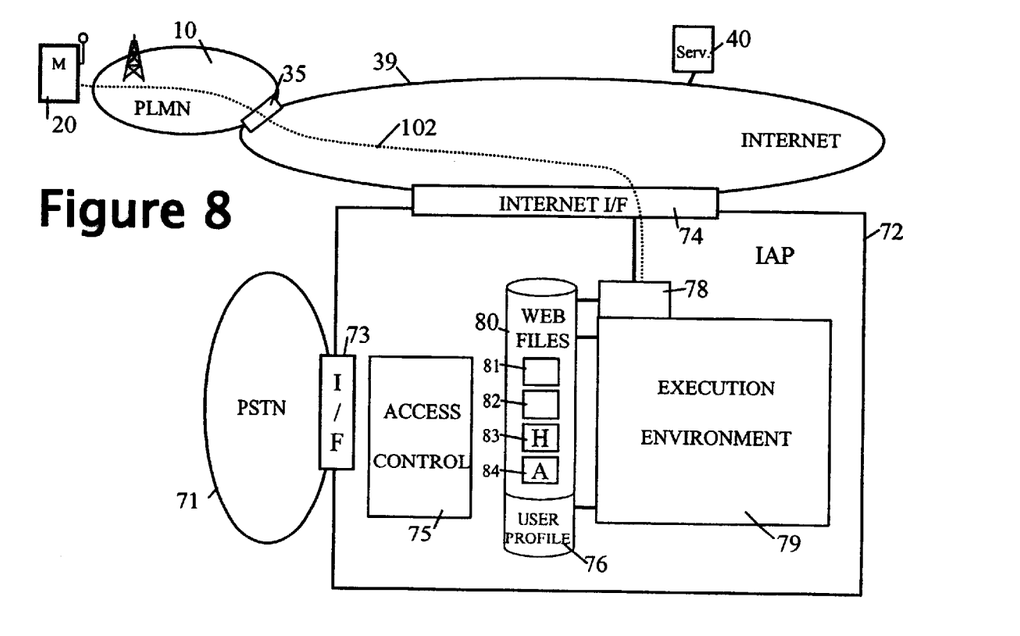
FIG. 8 is a diagram similar to FIG. 7 but illustrating the provision of the appropriate browser home page to a mobile user connected to the internet via a PLMN.

FIG. 8 depicts the user requesting access to his/her private home page from a mobile entity 20, via a data-capable bearer service of PLMN 10, gateway 35, internet 39 and the interface 74 of the user's IAP service system 72 (see dotted line 102). The request is generated by a program running in a data handling sub-system of the mobile entity 20. This program, more fully described below, serves to request, by file name, one or other of the private home page versions, these file names having been previously entered by the user during a set-up phase for the program. Also previously recorded, is the cell ID of the PLMN cell corresponding to the user's home area (this can be captured by requiring the user to indicate during the set-up phase of the program when the user is at "home"—the program being arranged to thereupon capture the current cell ID as detected by the radio sub-system of the mobile entity 20)

Figure 9:
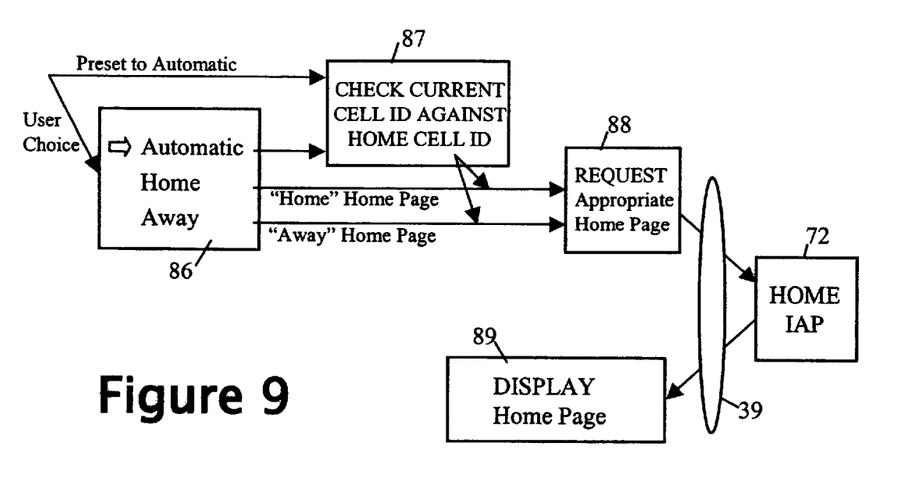
FIG. 9 is a diagram illustrating the steps involved in serving the appropriate home page back to the requesting mobile device in FIG. 8.

FIG. 9 depicts the steps involved in requesting and delivering the appropriate private home page to the user of mobile entity 20. The user can preset the program to pass directly to an automatic determination of the appropriate private home page version (step 87), or can have the program first display a selection page (step 86). In this latter case, the user can choose location-based automatic page selection or can specify either the "home" or "away" page versions as being required, thereby by-passing the location-based determination effected by step 87. If the user chooses automatic page selection or if this was preset, then step 87 is effected in which the program compares the current cell ID as provided by the radio sub-system of mobile entity 20, with the stored cell ID corresponding to the user's home area; if the cell IDs match, the home private home page is to be requested, otherwise the "away" private home page is requested. The actual sending of the request for the appropriate home page, as specified in step 86 or determined in step 87, is effected in step 88 by sending the relevant file name to the IAP service system, together with username/password information (or whatever other information may be required for access authorisation to the private home page of the user). Steps 86, 87 and 88 are all carried out in mobile entity 20. The request is received by the IAP service system 72 which returns the appropriate private home page. The private home page file is received by the mobile entity and displayed (step 89). It will be appreciated that the above process can be implemented using WAP with appropriate scripts.

Although in the foregoing the automatic determination as to which version of the private home page should be provided, was effected in the mobile entity on the basis of cell ID, a number of other possibilities exist both with respect to the parameter to be used for judging location and where the determination is made. Thus, instead of using cell ID as a location indicator, a more precise measure could be made using any of the techniques described in the introductory portion of the present specification; for example, location information could be provided by a location server associated with the PLMN 10 (c.f. location server 67 of FIG. 5). Where relatively accurate location information is available, the home area of a user can be specified as an area of given radius centred on a specified location such as the user's physical home (again, this location can be captured by appropriate triggering of the mobile entity to determine its location whilst at the home location, for example, by sending a request to a location server). As regards where version determination is done, it could be effected at the IAP service system 72 on the basis of the location of the mobile entity reported to it by the entity itself, or as obtained from a location server (with the specific or prior authorisation of the user). Furthermore, as will be seen below in relation to the FIG. 10 embodiment, the version determination can be done by an intermediate entity such as gateway 35. Where version determination is not effected in the user device (entity 20), the latter simply requests its private home page as identified by a single name; the file pointed to by this name will generally be a script file for bringing about version determination and page delivery (alternatively, the receiving system could be arranged to recognise the file name and trigger appropriate action).

Of course, access by the user to his/her private home page is not restricted to when the user is using a mobile entity and a PLMN; thus, the user could be accessing using a PC connected to the PSTN 71. In this latter case, the decision as to whether is in his/her home area could be made in the service system 72 simply on the basis of calling line ID, it being assumed that if the calling line ID does not correspond to the user's normal, home, calling ID, then the "away" private home page is appropriate. More sophisticated strategies, are, of course, possible. It will be appreciated that where version determination is carried out by the service system 72 rather than by the accessing device itself, then it may be necessary to define the user's "home" area in several different ways, each appropriate for a different type of access network (PSTN, PLN) since the current location of the accessing device may be determined in terms specific to that network.

Whilst in the foregoing, only two versions of the user's private home page have been used (a "home" version and an "away" version), it will be appreciated that more than two versions can be used, each associated with a particular area. For example, a distinction could be made between "away" in a foreign country and "away" in the user's home country. Furthermore, the version determination can be influenced by other parameters additional to location such as, in particular, the type of the device being used to access the private home page and the capabilities of the access network—thus, a much richer home page can be provided for PC-type devices having internet access via a corporate LAN, as compared to WAP cell phones. Indeed, private home page versions can be provided that are suitable for voice browsers and other non-visual interface devices (the use of such non-visual interfaces is not, of course, restricted to where they are merely an option amongst visual interfaces—all versions of the private home page could implement non-visual interfaces, even if the accessing device bad a visual interface capability).

Figure 10:
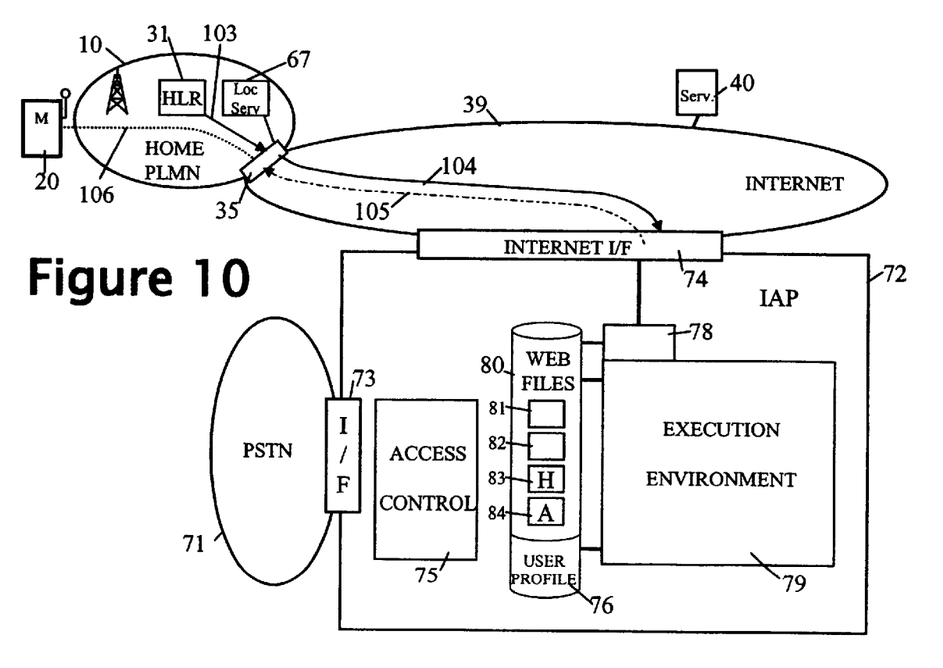
FIG. 10 is a diagram similar to FIG. 8 but illustrating the provision of the user's home pages by the IAP service system to a gateway of the PLMN, the latter being the user's home PLMN and the gateway being responsible for passing the correct home page to the mobile device.

Turning now to FIG. 10, in this embodiment, the user has specified in his/her user profile held in HLR 31 of the PLMN 10 (the user's home PLMN) that the user has location-based private home pages held by IAP service system 72. Now when the user requests internet access from mobile entity 20, the details of the user and service system 72 are extracted from the user's profile and past to the gateway 35 (see arrow 103). Gateway 35 can now act pre-emptively to load the versions of the user's private home page from the service system (see request arrow 104 and response arrow 105). Upon the user making a request for his/her private home page (dotted line 106), gateway traps the request and responds itself. In the FIG. 10 example, the determination of which version to use is effected by the gateway 35, it being authorised to request the location of mobile entity from location server 67 (and the home area details having been previously provided to the server 35 either from service system 72 or HLR 31). The gateway 35 need not act preemptively to fetch the home page version and could wait until requested for the user's private home page and then determine which version is required before requesting it from service system 72.

Figure 11:
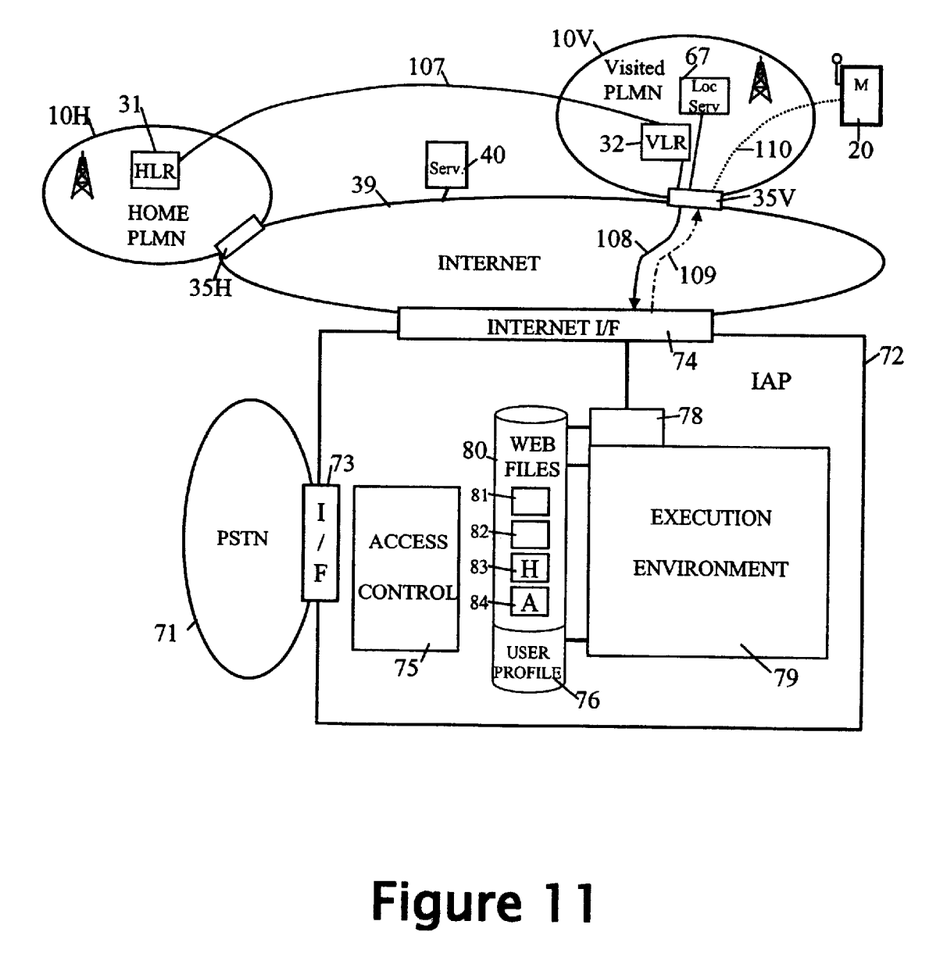
FIG. 11 is a diagram similar to FIG. 10 but illustrating the provision of the user's home pages to the gateway of a visited PLMN.

FIG. 11 illustrates the case of the user accessing via a visited PLMN 10V rather than through the user's home PLMN 10H. As with the FIG. 10 embodiment, the user's profile held by HLR 31 of the home PLMN 10H includes the details of the private home page version service. Upon the user accessing the visited PLMN 10V, the user's profile is obtained from the user's home PLMN (for example, using a protocol similar to the CAMEL protocol specified by ETSI for GSM networks) and passed to the relevant VLR 32 of the visited PLMN. Matters now proceed in a manner similar to that described for FIG. 10 with the gateway 35V of the visited network fetching the private homepage versions from the service system (arrows 108, 109), obtaining from location server 67 the location of mobile entity 20 when the latter requests its private home page (dotted line 110), and returning the appropriate home page version.

Where the user requests his/her private home page via an LAP service system which is not its home IAP system 72 but which has a cooperation agreement with the latter, then an arrangement similar to that described for the PLMN 10 in FIG. 10 can be used to have the visited service system participate in the version determination. This is achieved using the RADIUS protocol by which cooperating IAPs exchange authorisation and billing data. (see RFCs 2138 and 2139 of the Internet Engineering Task Force). In particular, when the visited service system contacts the system 72 to check the user's authorisation, system 72 sends the private home page version information to the visited service system for the latter to use (the visited system having been programmed to operate appropriately to provide the version determination service).

It may also be noted that the user's private home page version data need not be stored in the user's IAP service system and could for example be held by gateway 35 or another service system (such as system 40) independently of IAP system 72.

Figure 12:
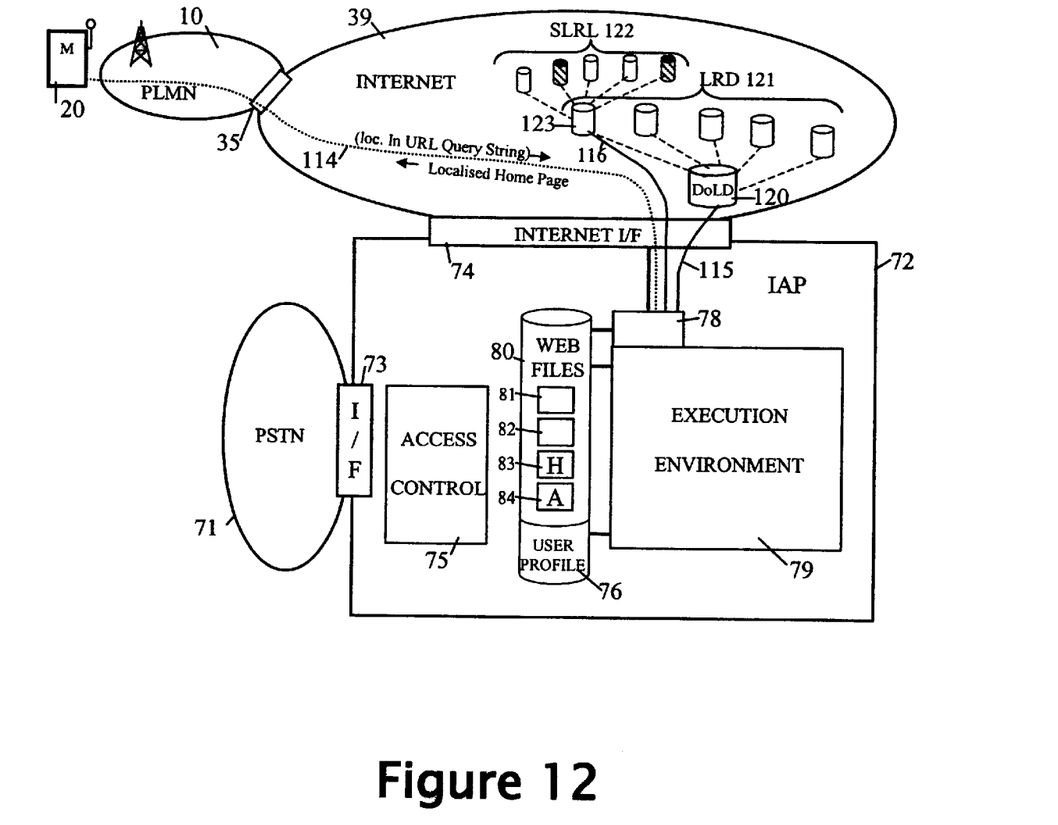
FIG. 12 is a diagram similar to FIG. 8 but illustrating the retrieval by the IAP service system of information elements relevant to the locale of the user, thee elements being included in the home page served to the user.

As mentioned above, the private home page versions may contain information that cannot be conveniently pre-specified but must be fetched when required (because, for example, it is information that is specific to the current locality of the user). FIG. 12 depicts such a situation where the user has specified that the "away" version of the private home page should contain a best restaurant list and theatre guide for the locality where the user is situated. Such lists can be generally termed "Specialist Local Resource Lists" (SLRL) and there will generally be a number of websites containing such lists for every significant town; these websites are depicted as servers 122 in FIG. 12. SLRL sites 122 are usually themselves listed in other, more general, sites here termed "Local Resource Directories" and depicted as servers 121 in FIG. 12. In turn these LRD sites will generally be listed in other sites, one such site—a Directory of Local Directories (DoLD)—is shown at 120 in FIG. 12.

The user identifies which lists are of interest by specifying SLRL category types to the service system during the running of the page set-up scripts 82

In the present example, it is assumed that the version determination is done in service system 72 in response to the mobile entity 20 sending a request for the user's private home page (see dotted line 114). This request includes as a query string of the request URL, the location of the user as determined, for example, by a location server of PLMN 10 On examining the location data, the service system 72 determines that the user's "away" home page version is required and that therefore it is necessary to obtain the URLs of SLRL websites 122 for best local restaurants and for local theatre guides. The required information is obtained by first contacting the DoLD server 120 (line 115) to retrieve the URL of the LRD site 121 relevant to the user's current location (this latter being passed to the server 120). Thereafter, the appropriate LRD site 123 is contacted (line 116) and passed the category types of the required specialist local resource lists; LRD responds with the URLs of the relevant SLRL sites 122 (these sites are shown hatched in FIG. 12). These URLs are then incorporated in the "away" private home page version which is sent to mobile entity 20.

As well as including URLs of relevant local sites, it is also possible to include specific items of information identified generically by the user during page set-up (such as the telephone number of the nearest local hospital). Of course, in order to enable such information to be extracted from amongst all the data available via the internet, it will generally be necessary for the user to identify during the set-up phase a source where the information can be found. Thus, the user may identify an XML document which by virtue of its structuring of information permits the relevant data to be extracted automatically.

It should be noted that although the determination of which private home page version should be used, and the process of providing location-specific content in a private home page version, both require the location of the user device (e.g. entity 20) to be known, these two processes are largely independent—thus, whilst the dame location data could be used for both, this is not required.

It will be appreciated that may variants are possible to the above-described embodiments of the invention.

What is claimed is:

1. A method of adapting a network-browser user interface to a user's location, comprising the steps of:

storing, in a system connected to a user-accessible network, user-specific interface specification data defining at least first and second user interface data sets for use in implementing network-browser user interface in respective different geographic areas, the interface specification data specifying for each data set a respective set of subjects about which information is to be presented, with the user using a device running a network browser for browsing said network, determining which user-interface data set of the user's interface specification data is appropriate for the current location of that device, transferring the appropriate data set to the device and using it to implement the network-browser user interface;

at least one data set specifying the inclusion of one or more elements relevant to the locale of the user device;

fetching said one or more elements in dependence on the current location of the device if a said at least one data set is determined to be the appropriate data set.

2. A method according to claim 1, wherein the task of fetching said one or more elements for the data set determined as appropriate for the current device location is effected by an intermediate entity associated with the locale where the device is situated, the relevant interface specification data being passed to this entity from where it is stored.

3. A method according to claim 1, wherein a said element comprises one of the following:

a specific data item of local information;

a hyperlink to a resource containing local information.

4. A method according to claim 3, wherein the task of fetching said one or more elements for the data set determined as appropriate for the current device location is effected by an intermediate entity associated with the locale where the device is situated, the relevant interface specification data being passed to this entity from said system.

5. The method of claim 1 wherein the at least one user-interface data set also specifies the inclusion of one or more elements by type as well as relevance to the locale of the user device, the method further including fetching said one or more elements in dependence on their respective specified types, as well as the current location of the device if at least one user-interface data set is determined to be the appropriate user-interface data set.

6. A method according to claim 5, wherein the task of fetching said one or more elements for the user-interface data set determined as appropriate for the current device location is effected by an intermediate entity associated with the locale where the device is situated, the relevant user-specific interface specification data being passed to this entity from where it is stored.

7. A method according to claim 5, wherein a said element comprises one of the following:

a specific data item of local information;

a hyperlink to a resource containing local information.

8. A method according to claim 7, wherein the task of fetching said one or more elements for the user-interface data set determined as appropriate for the current device location is effected by an intermediate entity associated with the locale where the device is situated, the relevant user-specific interface specification data being passed to this entity from said system.

9. A method according to claim 5, wherein the set of subjects of each of the first and second user-interface data sets are specified at least in part by said user.

10. A method according to claim 5, wherein the first user-interface data set is intended for use in implementing the network-browser user interface in a home area of a user and the second user-interface data set is intended for use in implementing the network-browser user interface in other areas, the step of determining which user-interface data set is appropriate for the current location of a user device including determining the current location of the user device and comparing it with the home area of the user.

11. A method according to claim 5, wherein the determination of which user-interface data set to use includes, in addition to making a location-dependent determination, a determination based on the type of the device concerned.

12. A method according to claim 5, wherein the user-specific interface specification data takes the form of a respective web page file for each said data set.

13. A method according to claim 5, wherein the user-specific interface specification data comprises data held in a user profile stored in said system and identifying, for each data set, said set of subjects.

14. A method according to claim 5, wherein each user-interface data set, taken individually, relates to a network-browser user interface of one of the following types:

a graphical user interface for a web browser;

an audio interface for a web browser.

15. A system comprising:

a communications subsystem;

a data store for storing user-specific interface specification data defining at least first and second user-interface data sets for use in implementing a network-browser user interface in respective different geographic areas, each user-interface data set specifying a respective set of subjects about which information is to be presented, and at least one user-interface data set specifying the inclusion of one or more elements, specified by type, relevant to the locale of the user device;

a control subsystem for handling a user request for a user-interface data set, the request being received via the communications subsystem from a user device running a network browser, and the control subsystem comprising:

a user-identity checking arrangement for checking the identity of the user of said device;

a location arrangement for providing location information about the location of the device;

a processing arrangement for determining which of the user-interface data sets of the user's own user-specific interface specification data is appropriate for the current location of the device as provided by the location-data arrangement;

a fetching arrangement, arranged to be responsive to the appropriate user-interface data set being determined to be a said at least one user-interface data set specifying the inclusion of one or more elements relevant to the locale of the user device, for fetching said one or more elements in dependence on the current location of the device and their respective specified types and an arrangement for sending to the user device the user-specific interface data set determined as appropriate by the processing arrangement together with the fetched elements.

16. A system according to claim 15, wherein a said element comprises one of the following:

a specific data item of local information;

a hyperlink to a resource containing local information.

17. A system according to claim 15, wherein the first user-interface data set is intended for use in implementing a network-browser user interface in a home area of the user and the second user-interface data set is intended for use in implementing a network-browser user interface in other areas, the processing arrangement being arranged for determining which user-interface data set is appropriate for the current location of the user device by comparing the current location of the user device with the home area of the user as indicated by data stored in respect of that user in the data store.

18. A system according to claim 15, wherein the location arrangement is operative to receive said location data, via the communications subsystem, from one of:

the device concerned;

a location server.

19. A system according to claim 15, the user-specific interface specification data takes the form of a respective web page file for each said data set.

20. A system according to claim 15, wherein the user-specific interface specification data comprises data held in a user profile stored in said data store and identifying, for each data set, said set of subjects.

* * * * *